Dec. 31, 1968    J. TILLACK    3,419,357

PROCESSES FOR MANUFACTURING IODINE OF VERY HIGH PURITY

Filed Feb. 1, 1967

INVENTOR.
JÜRGEN TILLACK

BY

AGENT

United States Patent Office 3,419,357
Patented Dec. 31, 1968

3,419,357
PROCESSES FOR MANUFACTURING IODINE
OF VERY HIGH PURITY
Jürgen Tillack, Aachen, Germany, assignor to North American Philips Company, Inc., New York, N.Y., a corporation of Delaware
Filed Feb. 1, 1967, Ser. No. 613,148
Claims priority, application Germany, Feb. 10, 1966, N 28,027
3 Claims. (Cl. 23—216)

ABSTRACT OF THE DISCLOSURE

Oxygen and oxygen containing compounds are removed from iodine by passing the iodine over hot tungsten and removing the free iodine by fractional sublimation.

Figure 1:
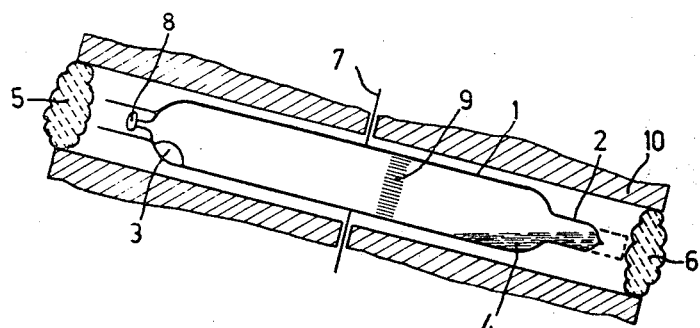

The manufacture of pure iodine, which has acquired considerable technical importance, especially as a result of the development of the so-called iodine lamps, has remained unsatisfactory hitherto.

Especially traces of water vapour in the iodine such as used for iodine lamps may be extremely harmful to the life of such lamps.

In fact, even small amounts of water vapour give rise to a greatly accelerated recrystallisation of the tungsten filament and to reduction of the mechanical stability thereof. They also enhance the whisker formation which may cause several turns of the helix to be bridged and result in a decreased resistance of the filament.

In an iodine lamp the tungsten evaporating from the filament is not preferably deposited back on areas of more than average evaporation (centre of the helix, hot spots), but the separation of tungsten is approximately constant over the whole length of the helix owing to the comparatively low thermal stability of the reaction partners. The loss of tungsten resulting therefrom at the hot areas of the filament is evidently accelerated considerably in the presence of water vapour so that the concentration of water vapour in an iodine lamp has to be maintained as low as possible.

Water vapour is not removed to a sufficient extent by sublimation of iodine over drying agents, for example, phosphorus pentoxide, such as is frequently effected in practice. An iodine preparation thus dried and tested with the aid of $T_2O$ exhibited a water content of 0.1%.

Halogens and halogen compounds (ICl, IBr) are not removed during the drying process. Further, when using $P_2O_5$, additional impurities, for example, lower phosphorous oxides which react with iodine, are introduced by the drying agent.

A primary object of the invention is to provide a process for manufacturing iodine which is anhydrous as far as possible.

Only in the presence of oxygen in elementary form or in an oxygen compound (such as, for example, water) tungsten and iodine are found to form a compound, namely tungstenoxyiodide ($WO_2I_2$) at an elevated temperature. At least it has been found that no tungsten iodides were formed in the tests described hereinafter. The process according to the invention for the manufacture of anhydrous iodine of very high purity, is characterised in that the iodine to be freed from oxygen and oxygen compounds in vapour form is brought into contact with heated tungsten and then separated from the resulting tungsten oxyiodide and other iodine compounds by fractional sublimation.

Oxygen and oxygen compounds, especially water vapour, are substantially removed from iodine by bringing the iodine vapours, with or without an inert gas, into contact with glowing tungsten of a temperature between approximately 700° C. and 1200° C. in an open or closed apparatus. Below 700° C. the velocity of the reaction is too low for practical purposes, and above 1200° C. difficulty is involved in connection with the apparatus to be used, especially with a quartz apparatus. The iodine purified by the process according to the invention generally contains less than 1 p.p.m. of oxygen compounds.

The loss of iodine which occurs in the process depends upon the amount of oxygen-containing impurities. In the above-mentioned conditions, iodine and tungsten react with each other in the presence of oxygen or oxygen compounds while forming tungstenoxy iodides which are sparingly volatile and condense on colder areas of the apparatus. Because of their greatly differing volatility, the iodine may readily be separated from the resulting tungstenoxy iodides by sublimation at moderately elevated temperature (approximately 100° C.).

When using an inert gas flow in an open apparatus, the hydrogen iodide formed in the presence of water vapour is removed together with the inert gas flow.

Since, under the above-mentioned conditions, bromine and chlorine and also most of their volatile compounds are also converted with tungsten to form sparingly volatile compounds in the presence of oxygen, these are also removed in the process according to the invention. This is also true for sulfur and compounds thereof which are substantially converted into sparingly volatile $WS_2$.

In the process according to the invention, the tungsten used obviously undergoes a certain purification also. The metallic impurities normally present in tungsten, such as, for example, iron, zirconium, copper, and chromium form, under the conditions of the process according to the invention, volatile iodides or oxy iodides which may be removed from the tungsten and separated from the iodine by fractional sublimation.

In the process according to the invention, it is therefore not necessary to use very pure tungsten. Because of their large specific surface areas, tungsten powder and tungsten granulates are especially suitable for use in the process according to the invention.

The $WO_2I_2$ formed in the process according to the invention deposits in the form of very thin, gold-brown glassy crystal leaves which progressively dissociate in free air and which may be a few millimeters in size. The compound is not soluble to a noticeable extent in water, in diluted mineral acids and in organic solvents such as, for example, chloroform, ether, ethanol, petroleum ether and benzene. With diluted lyes a colourless solution ensues, from which tungsten acid is obtained upon acidification. The properties given for $WI_2$ in literature correspond largely to those of the $WO_2I_2$. $WO_2I_2$ is distinctly volatile above 200° C. and can be sublimated without dissociation in the presence of a sufficient iodine pressure.

Figure 2:
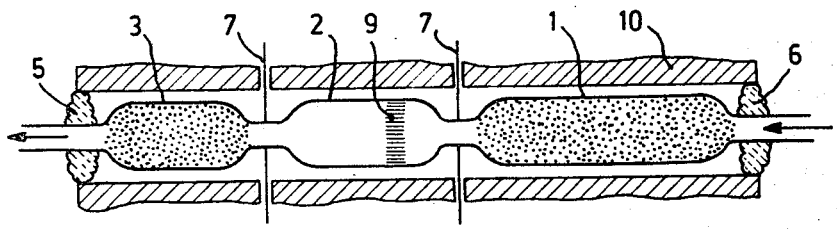

In order that the invention may be readily carried into effect, it will now be described in detail with reference to several examples and the accompanying diagrammatic drawing, in which:

FIGURE 1 shows a closed apparatus and
FIGURE 2 shows an open apparatus for manufacturing pure iodine.

Example 1

Purification in a closed apparatus (FIGURE 1).

In the apparatus shown in FIGURE 1 a quartz tube 1 about 150 mm. in length and 20 mm. in diameter was filled through a filling tube 2 with 2 g. of powdery tungsten 3 and 10 g. of iodine 4, exhausted over a cooling trap with liquid nitrogen and sealed tight. The tube 1 filled with tungsten and iodine 4 was introduced into an oven 10

(shown only in part) having a temperature gradient of approximately 800° C./approximately 300° C., the tungsten 3 lying on the hotter side. The oven was closed with asbestos plugs 5 and 6, and temperature levelling is prevented with the aid of asbestos paper 7. The tube 1 is provided, at 8, with a capillary tube which can be smashed to pieces. The iodine pressure in the tube is approximately 10 atms. at the specified temperatures. The iodine had not been specially dried before. The conversion was terminated after 24 hours. In region 9 at a temperature between 300° C. and 350° C. an annular crystal crust 9 of barely volatile, metallic glossy $WO_2I_2$ was noticeable which has formed substantially in accordance with the following reaction diagram.

$$WO_2 + I_2 \rightarrow WO_2I_2 \qquad (1)$$
$$2WO_3 + W + 3I_2 \rightarrow 3WO_2I_2 \qquad (2)$$
$$W + 2H_2O + 3I_2 \rightarrow WO_2I_2 + 4HI \qquad (3)$$

In order to test whether complete conversion has taken place, the tube 2 may be shifted up to 3 cm. to the right, (into the less hot region) and after a few hours it may be tested whether a new $WO_2I_2$ ring has formed.

After the purification of the iodine, the sealing nozzle 8 may be connected to a suitable sublimation apparatus and the iodine sublimated away after smashing the capillary tube. At a sublimation temperature between 50° C. and 80° C., the vapour pressure of the tungstenoxy halide formed during the above conversion is so low as to be unmeasurable.

In order to remove the hydrogen iodide formed in accordance with Equation 3 and the hydrogen which is in balance therewith, it is preferable to exhaust the sublimation apparatus again via a cooling trap with liquid nitrogen.

Transport experiments served as a criterion for the degree of purity of the iodine purified in accordance with this example. Thus it was found that in a temperature gradient between 800° C. and 1000° C., a noticeable tungsten transport into the hotter region did not take place even after 250 hours. Since in these conditions 1 mg. of transported tungsten can still be ascertained, calculation shows that the oxygen content is less than 1 p.p.m.

Example 2

Purification in an open apparatus (FIGURE 2).

The purification of iodine in an open apparatus (see FIGURE 2) is fundamentally effected in accordance with the same reaction mechanism as in a closed apparatus, except that the iodine is led over heated tungsten with the aid of a carrier gas, for example argon or nitrogen.

The inert gas flow loaded with iodine vapour enters the apparatus from the right and passes through a reaction zone 1 which contains tungsten heated to a tempertaure of approximately 800° C. In this region the impurities of the iodine and of the inert gas are converted with tungsten into more or less volatile compounds which either remain on the tungsten or condense in the comparatively cold region 2, temperature approximately 100° C. Reference numeral 9 indicates an annular crystal crust of barely volatile $WO_2I_2$. The region 3, which is again filled with powdery tungsten heated to approximately 800° C., serves substantially to test whether the conversion in region 1 and the condensation in region 2 have taken place quantatively. A metallic glossy deposit of $WO_2I_2$ at the left hand outlet of the oven would show that this was not the case.

The velocity of the gas flow depends upon the amount of impurities present in the iodine to be purified and upon the apparatus employed.

The pure iodine manufactured by the process according to the invention is especially suitable for filling iodine lamps, since it does not contain water and thus minimises unwanted recrystallisation of, and the whisker formation on, the tungsten filament and on the current-supply conductors.

The term "iodine lamp" has to be understood in this connection to mean a lamp in which, under operating conditions, tungsten evaporates from the filament and is deposited back onto the filament via a volatile tungsten iodine compound of the tungsten ($WO_2I_2$) in order to avoid blackening on the bulb of the lamp during the lifelength thereof.

The pure iodine manufactured by the process according to the invention may further be used in all cases where a transport agent of utmost impurity is required, for example, in growing crystals of semiconductor compounds through chemical transport.

What is claimed is:

1. A process for the production of iodine of very high purity from elemental iodine containing oxygen and compounds of oxygen, said process comprising bringing the iodine to be purified in vapor form into contact with heated tungsten to thereby form a combination of iodine and iodine containing compounds including tungsten oxyiodide and separating out the iodine from the iodine containing compounds by fractional sublimation, said sublimation being carried out at a temperature below that of the decomposition temperatures of the resultant tungsten oxyiodide.

2. The process of claim 1 wherein the tungsten is heated to a temperature between about 700° and 1200° C. to form the tungsten oxyiodide.

3. The process of claim 2 wherein the iodine to be purified is kept in contact with the heated tungsten until the formation of tungsten oxyiodide is completed.

References Cited

UNITED STATES PATENTS 1,671,213   5/1928   Van Arkel et al. _____ 23—216

OTHER REFERENCES

Lawson, W. D., Nielsen, S.; Preparation of Single Crystals pp. 24–25; Butterworth Scientific Publications; London, 1958.

Sneed, Maynard, & Brasted; Comprehensive Inorganic Chemistry vol. III, p. 80; Van Nostrand Co.; Princeton, N.J., 1954.

Mellor, J. W.; A Comprehensive Treatise on Inorganic and Theoretical Chemistry, vol. 11, p. 855, Longmans, Green & Co., N.Y., 1931.

OSCAR R. VERTIZ, Primary Examiner.

G. PETERS, Assistant Examiner.

U.S. Cl. X.R.

23—85